United States Patent
Goren

(10) Patent No.: US 7,167,717 B1
(45) Date of Patent: Jan. 23, 2007

(54) SYSTEM AND METHOD FOR WIRED NETWORK SYNCHRONIZATION FOR REAL TIME LOCATION TRACKING

(75) Inventor: David Goren, Smithtown, NY (US)

(73) Assignee: Symbol Technologies, Inc., Holtsville, NY (US)

(*) Notice: Subject to any disclaimer, the term of this patent is extended or adjusted under 35 U.S.C. 154(b) by 596 days.

(21) Appl. No.: 10/610,863

(22) Filed: Jun. 30, 2003

Related U.S. Application Data

(60) Provisional application No. 60/392,046, filed on Jun. 28, 2002.

(51) Int. Cl.
*H04B 7/01* (2006.01)

(52) U.S. Cl. .................. 455/502; 370/324; 375/356

(58) Field of Classification Search ............ 455/502, 455/503, 259, 260; 370/324, 350; 375/356, 375/375, 376
See application file for complete search history.

(56) References Cited

U.S. PATENT DOCUMENTS 6,230,021 B1* 5/2001 Ohdachi ............... 455/502

2006/0067451 A1* 3/2006 Pollman et al. ......... 375/367

OTHER PUBLICATIONS

"Enhancements to the RADAR User Location and Tracking System" by Bahl et al.; *Microsoft Research* and *University of California at San Dieago*; pp. 1-13.

"User Location and Tracking in an In-Building Radio Network" by Paramvir Bahl; *Microsoft Research, Technical Report*, Feb. 1999, pp. 1-12.

* cited by examiner

*Primary Examiner*—Lee Nguyen
(74) *Attorney, Agent, or Firm*—Baker Botts LLP

(57) ABSTRACT

A system and method is provided for timing synchronization of receivers in a wireless network to improve the accuracy of real time location tracking methods utilize time difference of arrival methods. The synchronization signals are provided over the wired network which connects the wireless receiver base stations. The timing signals may be transmitted on an unused pair of wires, or may be superimposed on a pair of wires which are used for Ethernet data signals or a pair of wires used for Ethernet DC power signals.

6 Claims, 3 Drawing Sheets

SYSTEM AND METHOD FOR WIRED NETWORK SYNCHRONIZATION FOR REAL TIME LOCATION TRACKING

CROSS-REFERENCE TO RELATED APPLICATIONS

This application claims priority to U.S. Provisional Patent Application No. 60/392,046, entitled "Wired Network Synchronization for Real Time Location Tracking," filed on Jun. 28, 2002, which is incorporated herein by reference in its entirety

FIELD OF THE INVENTION

This invention relates to communications systems and methods. In particular, the invention relates to a system and method for wired network synchronization for real time location tracking in a wireless communications system.

BACKGROUND OF THE INVENTION

In a wireless network environment, a well-known method of determining the location of a mobile transmitting device (e.g., an 802.11 mobile terminal) is time-difference-of-arrival (TDOA). In a TDOA method, a minimum of three receivers (more may be used) of known position precisely measure the time of arrival of a signal transmitted from the mobile transmitting device. The transmitted signal arrives at the receivers at different times depending on the relative location of the mobile transmitting device with respect to the various receivers. The closest receiver will receive the transmitted signal first, and the farthest receiver will receive the signal last. Between any two of the receivers, the time difference of arrival may be associated with a corresponding difference in distance. This difference defines a hyperbolic curve in physical space along which the mobile transmitting device must be located. A third receiver is then used to generated a different hyperbola. These hyperbolas intersect at the location of the mobile transmitting device. This method of triangulation is known as hyperbolic trilateration.

The radio signals travel at approximately the speed of light (roughly 1 nanosecond per-foot). Therefore extremely accurate timing and synchronization between the timing of the receivers is required in order to determine the position of the mobile transmitting device with any useful accuracy.

One method to synchronize the receivers is to utilize a dedicated timing cable between the receivers and a master clock. However, this solution is expensive and cumbersome.

In cases where the receivers also serve as network devices (e.g., an 802.11b Access Point), a solution is desired which uses the existing Ethernet cabling between the receivers and the network infrastructure to synchronize the clocks of the receiver base stations.

SUMMARY OF THE INVENTION

Accordingly, it is an object of the present invention to fulfill a need in the field of wireless communications systems by providing a system and method of wired network synchronization for real time location tracking.

Another object of the present invention it is to fulfill a need in the field of wireless communications systems by providing a system and method of wired network synchronization for real time location tracking in which an existing wired network is used.

In order to meet these and other objects of the present invention which will become apparent with reference to further disclosure set forth below, the present invention provides techniques for synchronizing the receivers in a wireless network using a wired network. One exemplary method includes the steps of coupling the receivers in the network via interconnecting cables, transmitting a master clock signal to the receivers via the interconnecting cables, using a master counter to count the master clock signal, and periodically modulating the clock signal to send a reset pulse to all receivers based upon a selected count in the master counter. Another exemplary method includes the steps of transmitting a master clock signal over the wired network, maintaining a count with a counter coupled to at least one receiver, transmitting a reset pulse over the wired network, and resetting the counter upon reset of the reset pulse over the wired network. An exemplary system includes two or more timing signal generators installed in two or more receivers coupled together by the wired network, a phase-locked loop installed in each of the two or more receivers and phase locked to a master clock signal which is provided over the wired network, and a counter for maintaining a count. Another exemplary system includes two or more wireless receivers coupled via a wired network, and timing circuitry coupled to the wired network and capable of generating a master clock signal, wherein the two or more wireless receivers are synchronized using the master clock signal.

The accompanying drawings, which are incorporated and constitute part of this disclosure, illustrate preferred embodiments of the invention and serve to explain the principles of the invention.

BRIEF DESCRIPTION OF THE DRAWINGS

Further objects, features, and advantages of the present invention will become apparent from the following detailed description taken in conjunction with the accompanying figures showing illustrative embodiments of the invention, in which.

Throughout the figures, unless otherwise stated, the same reference numerals and characters are used to denote like features, elements, components, or portions of the illustrated embodiments.

DETAILED DESCRIPTION OF THE INVENTION

Precise clock synchronization between a master clock and multiple 802.11 access points or other network devices) is achieved by sending a synchronization signal over existing network cables. A clock-reset pulse is periodically modulated on the signal to perform global counter resets.

Figure 1:
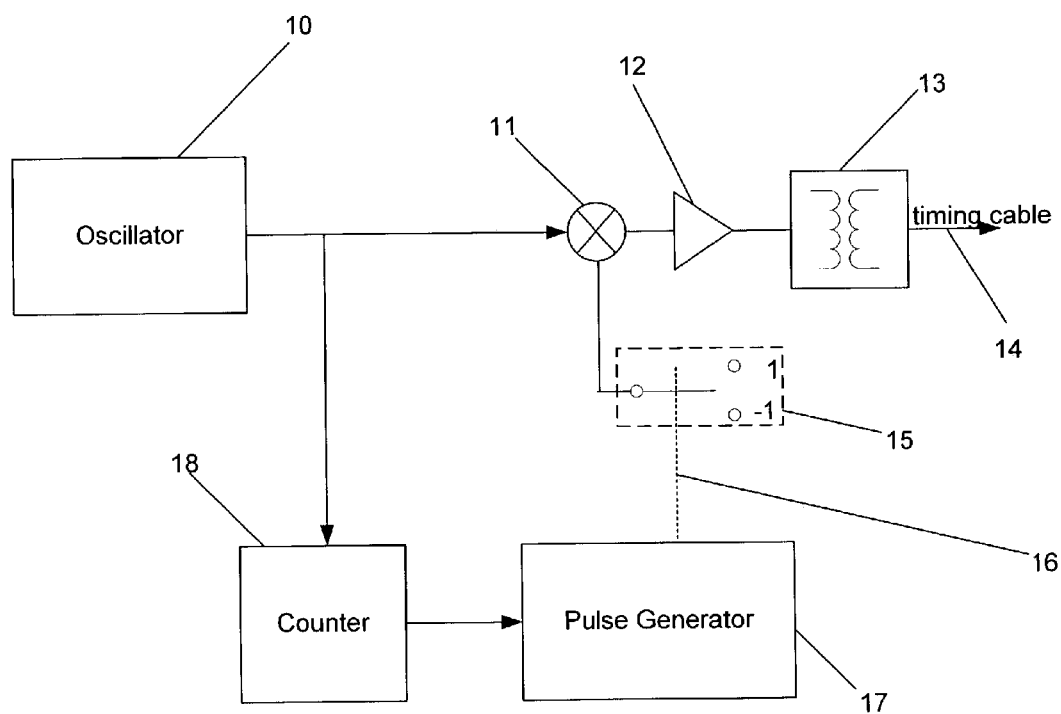
FIG. 1 is a circuit diagram of a timing signal generator providing clock signals to a timing cable.

Referring to FIG. 1, an exemplary embodiment of a system according to the present invention is shown. FIG. 1 shows a simplified block diagram of a clock signal generator or master clock. An oscillator 10 provides a clock signal to be transmitted through buffer 12 and an impedance matching element 13 to timing cable 14. A counter 18 may be used to periodically trigger pulse generator 17 and switch 15 to modulate the transmitted clock signal produced by oscillator 10, effectively sending a reset pulse over timing cable 14 to all the receivers on the network, forcing all the timers to synchronously reset.

Figure 2:
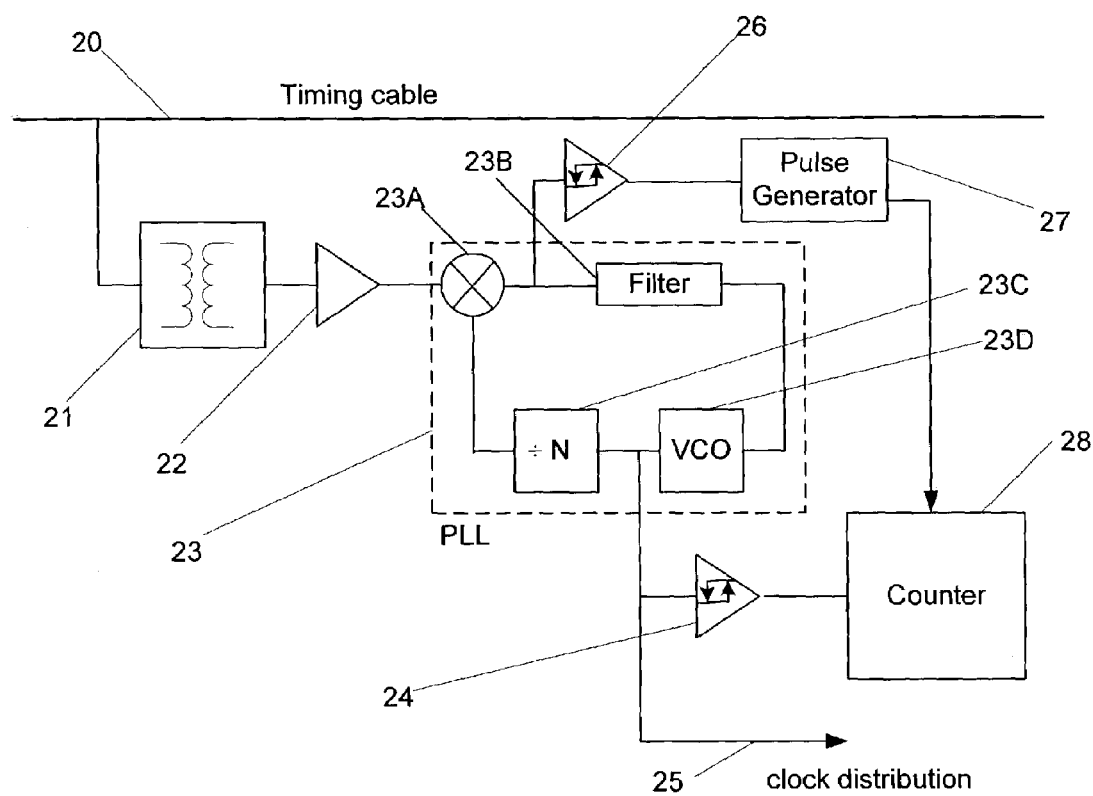
FIG. 2 is a circuit diagram of a timing receiver connected to the timing cable of FIG. 1

Referring to FIG. 2, a block diagram of a clock receiver according to an exemplary embodiment of the present invention is shown. The clock receiver circuit depicted may be, used in each receiver base station on the network. The timing cable 20 (e.g., an unused pair of wires in an Ethernet cable) carrying the received clock signal may be buffered using a buffer 22 and sent to a phase-locked loop (PLL) circuit 23. The PLL can have a divide-by-N block 23C within its feedback path to perform clock division if required. This will allow a lower frequency signal to be sent over the cable than is actually required for synchronization. A low pass filter 23B in the loop may be used to reduce the phase noise and to filter out any short bursts of modulation which are used to generated a counter reset. The output of the voltage-controlled oscillator (VCO) 23D is phase-locked to the master clock and is used to time-stamp a received packet. The generated phase-locked clock can also be used as a reference for other logic elements in the receiver module through path 25.

In another exemplary embodiment of a system according to the present invention, the timing signals may be superimposed on wires that are used for power in an Ethernet network. Where an unused pair of wires in an Ethernet cable is used for DC power, the high frequency timing signal can be added or capacitively coupled to the DC power signals. Simple filtering known in the art can be used to separate the high frequency timing signals from the DC power signals. Once the high frequency timing signal is separated, the receiver shown in FIG. 2 may be used in the same manner as described above.

Figure 3:
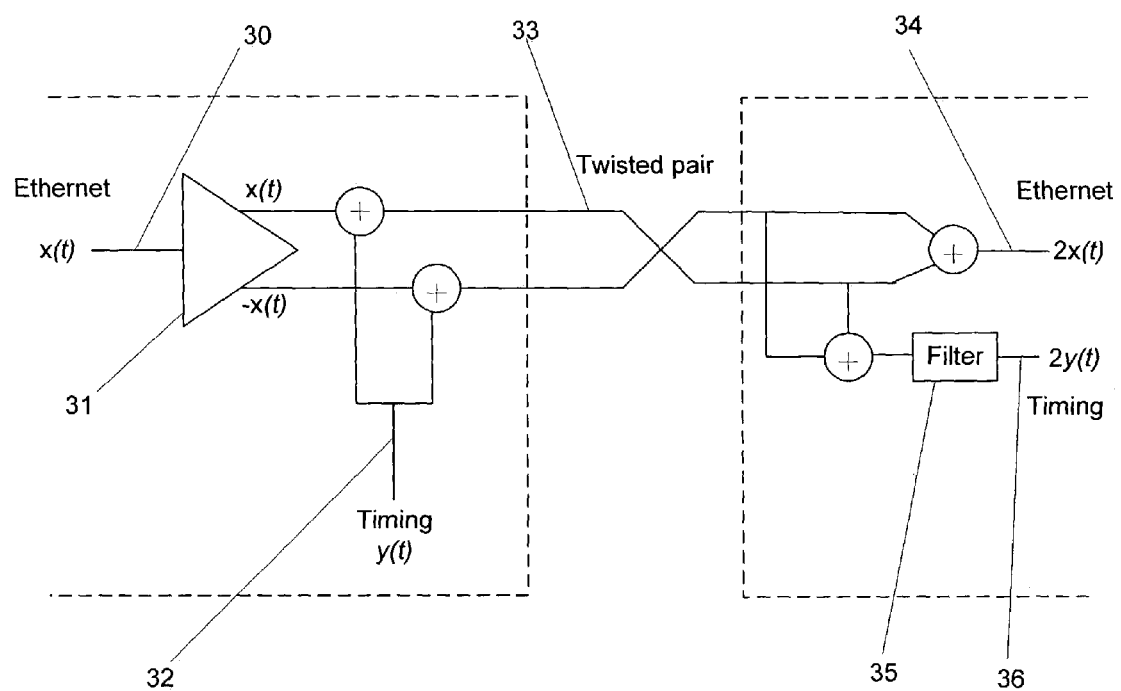
FIG. 3 is a representation of a timing signal superimposed with data transmitted over an existing Ethernet network.

In another exemplary embodiment of a system according to the present invention, the timing signals may be superimposed on a twisted-pair of wires that is used for data transmission. If an unused pair of wires in the Ethernet cables is unavailable, the timing signal may be superimposed on the data wires. Referring to FIG. 3, a simplified block diagram of such a system is shown. The Ethernet data 30, x(t), is transmitted differentially through the twisted pair 33. The timing signal 32, y(t), is added equally on both wires of twisted pair 33, in-phase. At the receiver, the added timing signal will be removed from the data signals due to the common-mode rejection of the differential receiver producing a received signal 34 equal to 2x(t). To extract the timing signal from this signal, the signals from the twisted pair may simply be summed, thereby removing the data signal and producing signal 26 equal to 2y(t). In addition, a simple filter 35 can be employed to remove any unwanted noise from the timing signal.

Due to the different lengths of network cables which may connect the master clock to the various devices being synchronized, there will be fixed timing offsets between the various clocks in the system. The reset pulse modulated on the timing signal can be used to initiate a self-calibration cycle to automatically adjust for these offsets. A reset pulse can cause the current time on the receiver counter to latch. The latched count is then sent to a central controller along with the identity of the particular receiver. The central controller can then compare all the counts to the master clock and calculate the time delays from the master clock to each receiver. These delays can be stored in a table and used to correct the observed time of arrival of the transmitted signal at each receiver.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

I claim:

1. A method for synchronizing receivers in a wireless network via a wired network to improve accuracy of real time location tracking, comprising the steps of:

coupling the receivers in the network via interconnecting cables;

transmitting a master clock signal to the receivers via the interconnecting cables;

using a master counter to count the master clock signal; and periodically modulating the clock signal to send a reset pulse to all receivers based upon a selected count in the master counter.

2. The method of claim 1, further comprising the steps of:

superimposing the clock signal on power signals transmitted in the interconnecting cable; and filtering the clock signal from the power signals to identify the reset pulse.

3. The method of claim 1, further comprising the steps of:

superimposing the clock signal on data signals transmitted in the interconnecting cable; and filtering the clock signal from the data signals to identify the reset pulse.

4. A system for synchronizing receivers in a wireless network via a wired network to improve accuracy of real time location tracking, comprising:

two or more timing signal generators installed in two or more receivers coupled together by the wired network;

a phase-locked loop installed in each of the two or more receivers and phase locked to a master clock signal which is provided over the wired network; and a counter for maintaining a count;

wherein the master clock signal is periodically modulated to send a reset pulse to the two or more receivers based upon the count in the counter.

5. The system of claim 4, further comprising a voltage controlled oscillator included in the phase-locked loop for driving a local counter.

6. The system of claim 4, further comprising a low-pass filter included in the phase-locked loop.

* * * * *